United States Patent
Kojima et al.

(10) Patent No.: US 8,140,253 B2
(45) Date of Patent: Mar. 20, 2012

(54) SHIFT MAP SWITCHING CONTROL UNIT

(75) Inventors: Hiroyuki Kojima, Wako (JP); Yoshiaki Nedachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 923 days.

(21) Appl. No.: 11/925,055

(22) Filed: Oct. 26, 2007

(65) Prior Publication Data

US 2008/0162008 A1 Jul. 3, 2008

(30) Foreign Application Priority Data

Dec. 27, 2006 (JP) ................................ 2006-353050

(51) Int. Cl.
*G06F 17/00* (2006.01)
*G06F 7/00* (2006.01)

(52) U.S. Cl. .............. 701/123; 701/51; 701/53; 701/55; 701/56

(58) Field of Classification Search .................. None
See application file for complete search history.

(56) References Cited

U.S. PATENT DOCUMENTS

| | | | | |
|---|---|---|---|---|
| 4,386,406 A | * | 5/1983 | Igarashi et al. ............... | 701/123 |
| 4,509,044 A | * | 4/1985 | Yachida ........................ | 345/204 |
| 4,669,335 A | * | 6/1987 | Matsuoka et al. ............ | 477/129 |
| 6,019,701 A | * | 2/2000 | Mori et al. ...................... | 477/46 |
| 6,508,118 B1 | * | 1/2003 | Eck ............................... | 73/290 V |
| 6,542,804 B2 | * | 4/2003 | Muratomi ........................ | 701/62 |
| 7,160,227 B2 | * | 1/2007 | Kuwahara et al. ............ | 477/116 |
| 7,549,497 B2 | * | 6/2009 | Homan et al. ................. | 180/233 |
| 2001/0012976 A1 | * | 8/2001 | Menig et al. ...................... | 701/1 |
| 2005/0143221 A1 | * | 6/2005 | Kuwahara et al. .............. | 477/97 |

FOREIGN PATENT DOCUMENTS

JP 63-254257 A 10/1988

* cited by examiner

*Primary Examiner* — Khoi Tran
*Assistant Examiner* — Bao Long T Nguyen
(74) *Attorney, Agent, or Firm* — Westerman, Hattori, Daniels & Adrian, LLP

(57) ABSTRACT

A shift map switching control unit includes a fuel level sensor 72, plural shift maps for deriving the shift timing of an automatic transmission 1b, and a controller 101 that selects one shift map out of the plural shift maps and controls the shift of the automatic transmission 1b according to the selected shift map. The controller 101 switches a standard shift map 103 to a high fuel economy shift map 104 in which fuel consumption is reduced when it is sensed that the residual quantity of fuel is equal to or below a predetermined value. An operational mode display lamp 99 displays the selected shift map. As the residual quantity of fuel is sensed, based upon a mean value of output signals from the fuel level sensor 72 in predetermined time, the shift maps can be prevented from being frequently switched.

2 Claims, 7 Drawing Sheets

<STANDARD SHIFT MAP>

<HIGH FUEL ECONOMY SHIFT MAP>

SHIFT MAP SWITCHING CONTROL UNIT

BACKGROUND OF THE INVENTION

The present invention relates to a shift map switching control unit, and more particularly relates to a shift map switching control unit that can switch a shift map of an automatic transmission to a shift map in which fuel consumption is reduced according to residual quantity of fuel in a fuel tank.

A configuration in which shift maps for determining shift timing can be switched according to a change of a running condition and a rider's intention in a shift control unit of an automatic transmission is hitherto known. Operation for switching the shift maps is arbitrarily performed by a rider and in addition, a technique for automatically switching them based upon output values from various sensors is well-known.

In JP-A No. S63-254257, a shift control unit includes a shift map (an economical mode) in which fuel economy is emphasized and a shift map (a power mode) in which engine performance is emphasized. A configuration that the power mode is selected only when a condition in which an angle of a throttle operated by a rider is equal to or larger than a set angle continues for fixed time, or longer, while an automatic selection function of the shift maps is set.

However, according to the technique of JP-A No. S63-254257, control over switching shift maps is made based upon an output signal of a throttle angle sensor and no method of switching shift maps according to residual quantity of fuel in a fuel tank is disclosed or suggested.

SUMMARY OF THE INVENTION

An object of the invention is to address the problem of the related art and to provide a shift map switching control unit that can switch a shift map of an automatic transmission to a shift map in which fuel consumption can be reduced according to residual quantity of fuel in a fuel tank.

To achieve the object, the invention is based upon a shift map switching control unit provided with residual quantity sensing means that senses residual quantity of fuel in a fuel tank of a vehicle, plural shift maps for deriving the shift timing of an automatic transmission and a controller that selects one shift map out of the plural shift maps and controls the shift of the automatic transmission according to the one shift map, and has a first characteristic that the controller switches the one shift map to a shift map of a high fuel economy type in which fuel consumption is reduced, when it is sensed that the residual quantity of fuel in the fuel tank is equal to or below a predetermined value.

In addition, the invention also includes a display that displays a condition in which the shift map of the high fuel economy type is selected.

Further, residual quantity in the fuel tank is sensed, based upon a mean value of output signals from the residual quantity sensing means in predetermined time.

Accordingly, as the controller switches the currently selected one shift map to the shift map of the high fuel economy type, in which fuel consumption is reduced, when it is sensed that the residual quantity in the fuel tank is equal to or below the predetermined value, distance drivable with residual fuel can be extended without rider's operation for switching. Hereby, the anxiety of the rider about the shortage of gasoline is reduced and a sense of security can be given to the rider.

Further, as the display shows a condition in which the shift map of the high fuel economy type is selected, the rider can recognize that the shift map of the high fuel economy type is applied. Hereby, the rider's attention is directed to the residual quantity of fuel and the possibility that the rider may run out of gas can be reduced.

Still further, as the residual quantity in the fuel tank is sensed, based upon the mean value of output signals from the residual quantity sensing means in the predetermined time, operation for switching the shift maps can be prevented from being frequently executed when a level of fuel in the fuel tank is rocked depending upon a driven condition, causing an output signal from the residual quantity sensing means to vary.

DETAILED DESCRIPTION OF THE INVENTION

Figure 1:
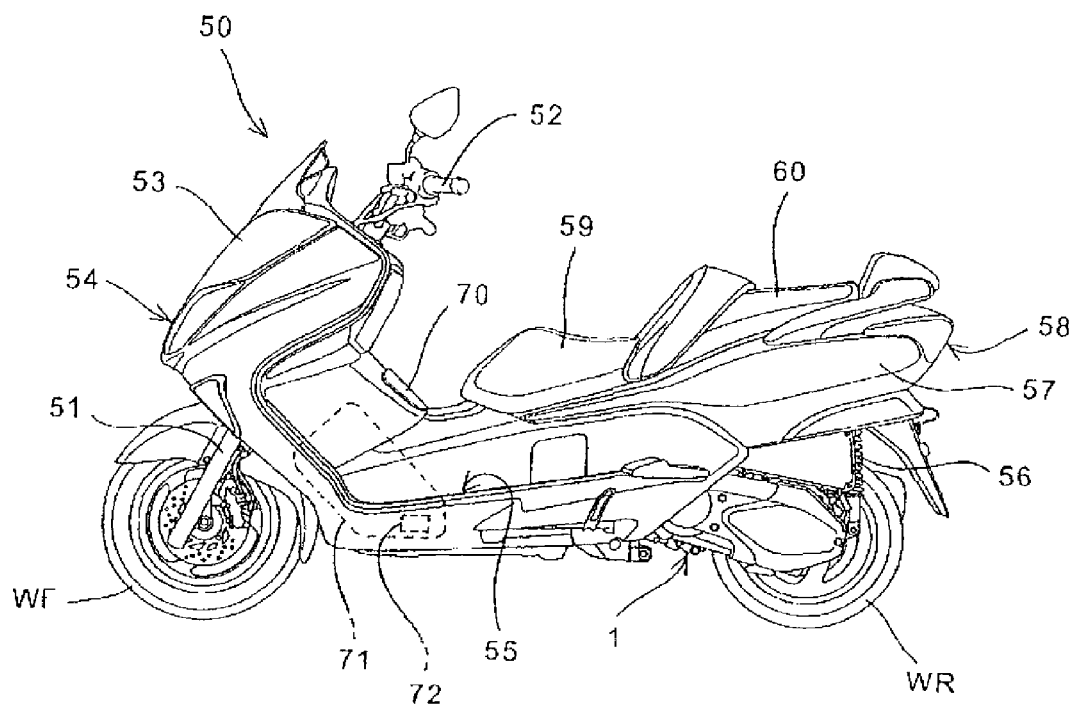
FIG. 1 is a side view showing a motorcycle equivalent to one embodiment of the invention.

Referring to the drawings, a preferred embodiment of the invention will be described in detail below. FIG. 1 is a side view showing one embodiment of a motorcycle to which the invention is applied. The scooter-type motorcycle 50 is provided with a swing-type power unit 1 housing a continuously variable automatic transmission in which continuous shift control is automatically executed. A pair of right and left front forks 51 that rotatably journal a front wheel WF are attached on the front side of the body of the motorcycle 50 so that the forks can be steered by a handlebar 52. A lower end of a front cowl 53, inside which a headlight unit 54 is disposed, is extended on the rear side of the body and is coupled to a pair of right and left footrests 55. A detachable lid 70 for accessing a fuel filler port of a fuel tank 71 is arranged above the footrests 55.

The fuel tank 71 covered with exterior parts is attached to a body frame, is inclined toward the front side of the body, and a fuel level sensor 72, as residual quantity sensing means, is located inside of fuel tank 71. The fuel level sensor 72 is a well-known one that senses a position of a float floating on a fuel level, for example, and outputs an electric signal required for display on a fuel gauge of the motorcycle 50. The power unit 1 that rotatably journals a rear wheel WR is rockably attached to the body because its front end is journaled by the body frame and the rear end is suspended from a rear cushion unit 56. A seat cowl 57, inside which a tail lamp unit 58 is located, is positioned over the rear cushion unit 56. A front seat 59 on which a rider is seated and a pillion 60 are attached to an upper side of seat cowl 57.

Figure 2:
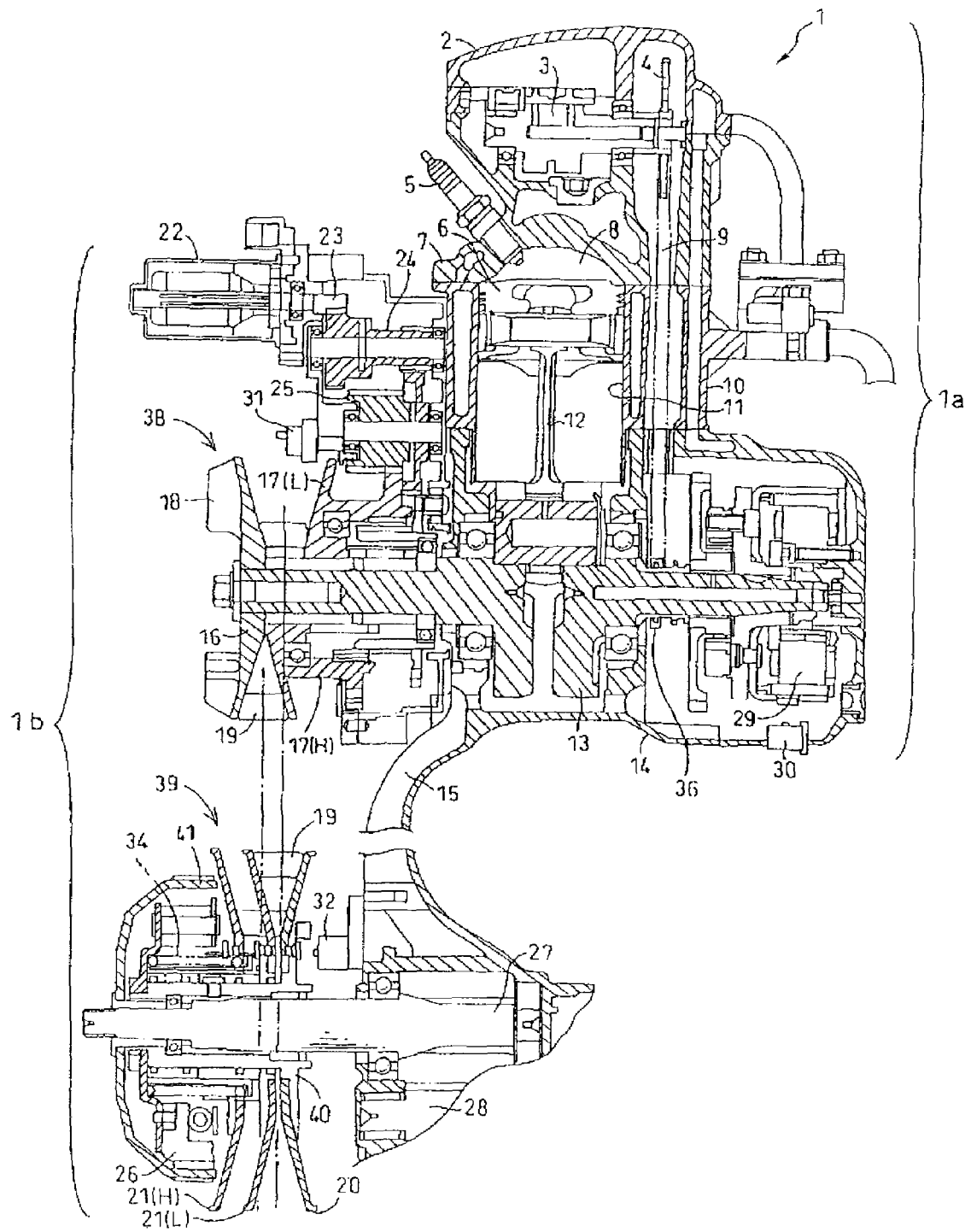
FIG. 2 is a sectional view showing a power unit of the motorcycle.

FIG. 2 is a sectional view showing the power unit 1. The power unit 1, in which an engine 1*a* as a power source and the automatic transmission 1*b* that transmits the driving force of the engine 1*a* to the rear wheel WR at arbitrary gear ratio are integrated, is rockably coupled to a pivot in the rear of the body frame of the motorcycle 50 with a lateral direction in the drawing as a direction of the width of the body. A piston 6 is coupled to a crankshaft 13 that is an output shaft of the engine 1a via a connecting rod 12 and can be reciprocated inside a cylinder 11 provided to a cylinder block 10. A cylinder head 7 is fixed to an upper end of the cylinder block 10 and a combustion chamber 8 for combusting air-fuel mixture is formed by the cylinder head 7, the cylinder 11 and the piston 6.

Valves (not shown) that control the intake and the exhaust of air-fuel mixture into/from the combustion chamber 8 and an ignition plug 5 for igniting the compressed air-fuel mixture are arranged in the cylinder head 7. The operation for opening and closing the intake/exhaust valves is controlled by the rotation of a camshaft 3 journaled by the cylinder head 7. A driven sprocket 4 is provided to a right end of the camshaft 3 over which a cylinder head cover 2 is disposed and a looped cam chain 9 is wound onto the driven sprocket 4 and onto a driving sprocket 36 installed on the crankshaft 13.

An ACG starter motor 29, rotated by the crankshaft 13, is housed at a right end of a crankcase 14 that journals the crankshaft 13 and in the vicinity of the ACG starter motor, an Ne sensor 30 that detects the engine speed of the engine 1a based upon the number of revolutions of the ACG starter motor 29 is attached. In the meantime, the automatic transmission 1b, including a driving-side pulley 38, a V-belt 19 and a driven-side pulley 39, is coupled to the left side of the crankshaft 13. A fan 18 for forcedly cooling the automatic transmission 1b and others by rotating it in synchronization with the crankshaft 13 is formed on the driving-side pulley 38. The automatic transmission 1b in this embodiment is a continuously variable belt converter in which the looped V-belt 19 is wound onto the driving-side pulley 38 connected to a left end of the crankshaft 13 and onto the driven-side pulley 39 mounted on a driving shaft 27 journaled in parallel with the crankshaft 13 by a transmission case 15 via a starting clutch 26. A gear ratio control motor 22 for arbitrarily varying gear ratio is provided in the vicinity of the driving-side pulley 38.

The driving-side pulley 38 is provided with a driving-side fixed pulley half 16 fixed to the left end of the crankshaft 13 and a driving-side movable pulley half 17 mounted slidably in an axial direction of the crankshaft 13. A feed screw is formed on the right side of the driving-side movable pulley half 17 and the driving-side movable pulley half 17 can be axially slid by the torque of the gear ratio control motor 22 transmitted via a pinion gear 23, a first transmission gear 24 and a second transmission gear 25. A gear ratio sensor 31 that detects gear ratio by sensing a position of the driving-side movable pulley half 17 is attached in the vicinity of the driving-side movable pulley half 17.

In the meantime, the driven-side pulley 39 is provided with a driven-side fixed pulley half 20 fixed to a sleeve 40 integrally rotated with a rotor that holds the starting clutch 26 and a driven-side movable pulley half 21 that can be slid in an axial direction of the sleeve 40. The V-belt 19 is wound onto each belt groove having a substantially V-type section respectively formed between the driving-side fixed pulley half 16 and the driving-side movable pulley half 17 and between the driven-side fixed pulley half 20 and the driven-side movable pulley half 21. A spring 34 that constantly presses the driven-side movable pulley half 21 toward the driven-side fixed pulley half 20 is arranged on the back side of the driven-side movable pulley half 21.

The starting clutch 26 cuts off the transmission of driving force between the driven-side pulley 39 and the driving shaft 27 when the number of revolutions of the driven-side pulley 39 is smaller than a predetermined value. When engine speed increases and the number of revolutions of the driven-side pulley 39 is equal to or larger than the predetermined value (for example, 3000 rpm), the starting clutch 26 is operated by centrifugal force and an inside face of an outer case 41 is pressed. Hereby, the rotation of the driven-side pulley 39 is transmitted to the outer case 41 via the starting clutch 26 and rotates the driving shaft 27 fixed to the outer case 41, a transmission shaft 28 engaged with the driving shaft 27 and an axle (not shown) of the rear wheel WR engaged with the transmission shaft 28. A vehicle speed sensor 32 that detects the vehicle speed of the motorcycle 50 based upon the number of revolutions of the sleeve 40 is attached in the vicinity of the sleeve 40.

The change of gear ratio of the automatic transmission 1b is performed by rotating the gear ratio control motor 22 in a direction according to the increase or the decrease of gear ratio. In this embodiment, when a rotational direction of the gear ratio control motor 22 is equivalent to a shift raised direction (a top ratio direction), the driving-side movable pulley half 17 is slid in a left direction in the drawing. Hereby, as the driving-side movable pulley half 17 approaches the driving-side fixed pulley half 16, and the belt groove width of the driving-side pulley 38 decreases, a contact position of the driving-side pulley 38 and the V-belt 19 is off outside in a radial direction and a diameter in which the V-belt 19 is wound increases (in this drawing, a low ratio position 17(L) is shown on the upside of the crankshaft 13 and a top ratio position 17(H) is shown on the downside of the crankshaft 13).

According to the above-mentioned shift operation, a force that tries to reduce the wound diameter operates because distance between the crankshaft 13 and the driving shaft 27 is unchanged in the driven-side pulley 39 and the driving side pulley 38, around which the V-belt 19 is looped. Therefore, the driven-side movable pulley half 21 is slid in the left direction in the drawing against resilient force produced by the spring 34 and groove width formed by the driven-side fixed pulley half 20 and the driven-side movable pulley half 21 increases. As described above, the change of gear ratio by the automatic transmission 1b is realized by continuously varying the diameter around which the V-belt 19 is wound (a transmission pitch diameter) and the automatic transmission 1b can continuously select arbitrary gear ratio by controlling the gear ratio control motor 22. Therefore, the automatic transmission 1b sets some fixed gear ratios (for example, 7 stages) and may also execute automatic shift among the fixed gear ratios in addition to smooth driving by continuous shift, and can also execute shift control like manual transmission in which shift operation among the fixed gear ratios is performed by the rider.

Shift timing in the above-mentioned automatic shift control is determined according to a shift map preset experimentally and other way. Normally, such a shift map is a three-dimensional map in which engine speed as shift timing is derived using a throttle angle and vehicle speed as a parameter. A shift map switching control unit according to the invention can be applied to various automatic transmissions such as a torque converter-type automatic transmission and a sequential multi-stage transmission in which shift operation is automatically performed in addition to the continuously variable automatic transmission.

Figure 3:
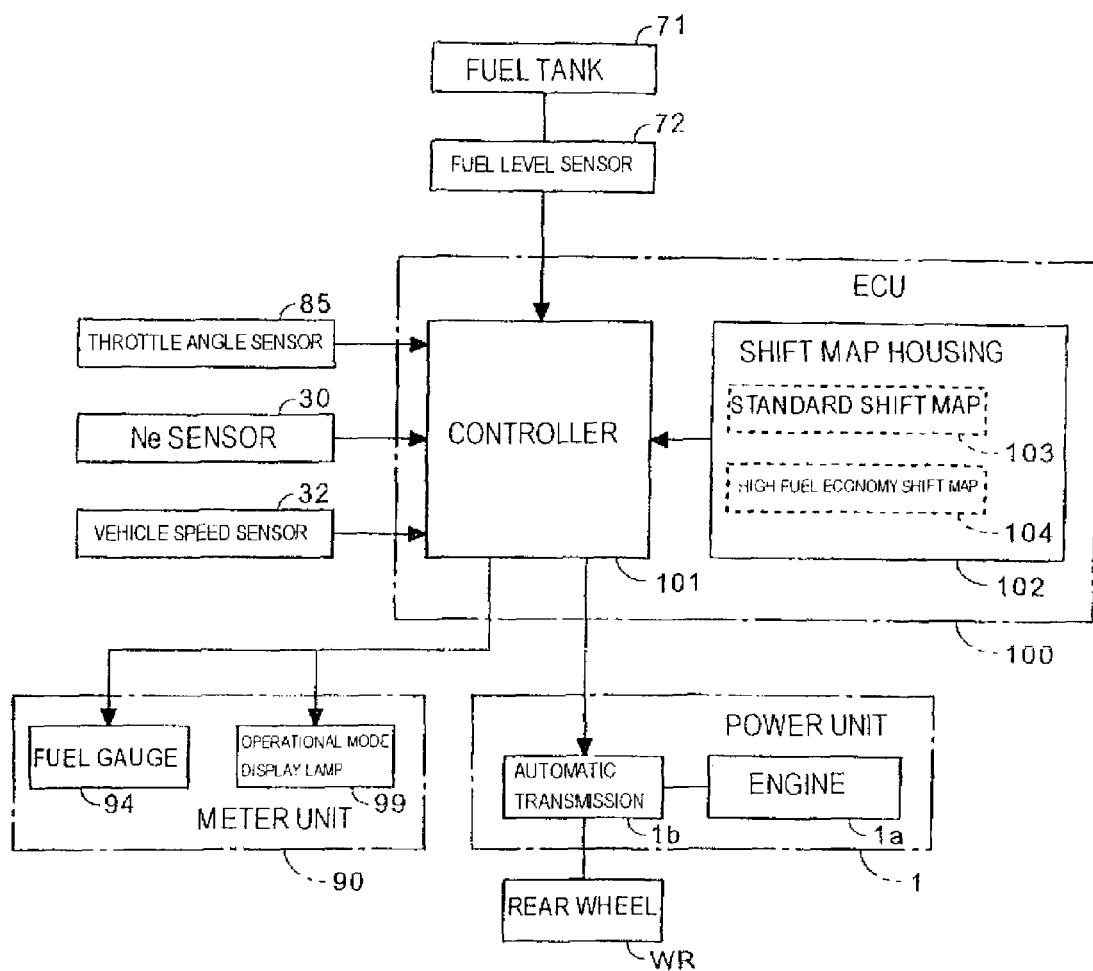
FIG. 3 is a block diagram showing a shift map switching control unit equivalent to one embodiment of the invention.

FIG. 3 is a block diagram showing the shift map switching control unit equivalent to one embodiment of the invention. The same reference numeral as the above-mentioned denotes the same or the similar part. An engine control unit (ECU) 100 attached inside the body of the motorcycle 50 includes a controller 101 that controls the shift of the automatic transmission 1b and a shift map housing 102 housing a standard shift map 103 and a high fuel economy shift map 104. Each output signal from a throttle angle sensor 85, the Ne sensor 30, the vehicle speed sensor 32 and the fuel level sensor 72 of the fuel tank 71 is input to the controller 101. In a meter unit 90 driven according to a driving signal from the controller 101, the fuel gauge 94 and an operational mode display lamp 99 are included. In this embodiment, the configuration including the fuel level sensor 72, the controller 101 and the shift map housing 102 is called the shift map switching control unit, however, the configuration called as described above can take many different forms.

Figure 4:
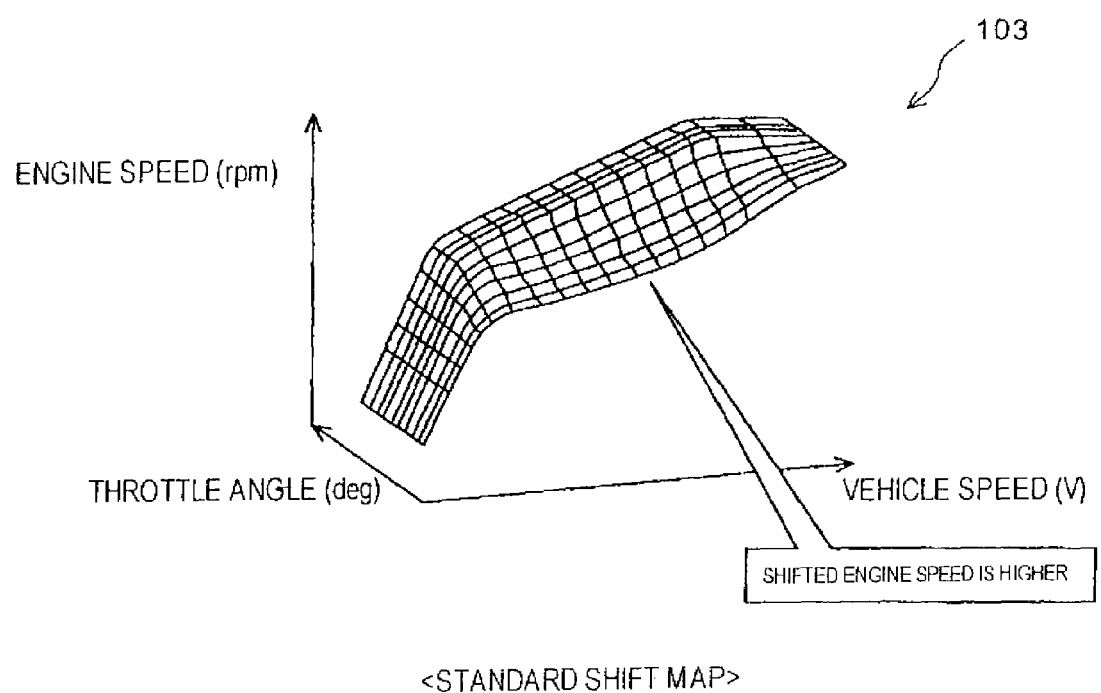
FIGS. 4(*a*) and 4(*b*) show one example of shift maps housed in a shift map housing.
Figure 4B:
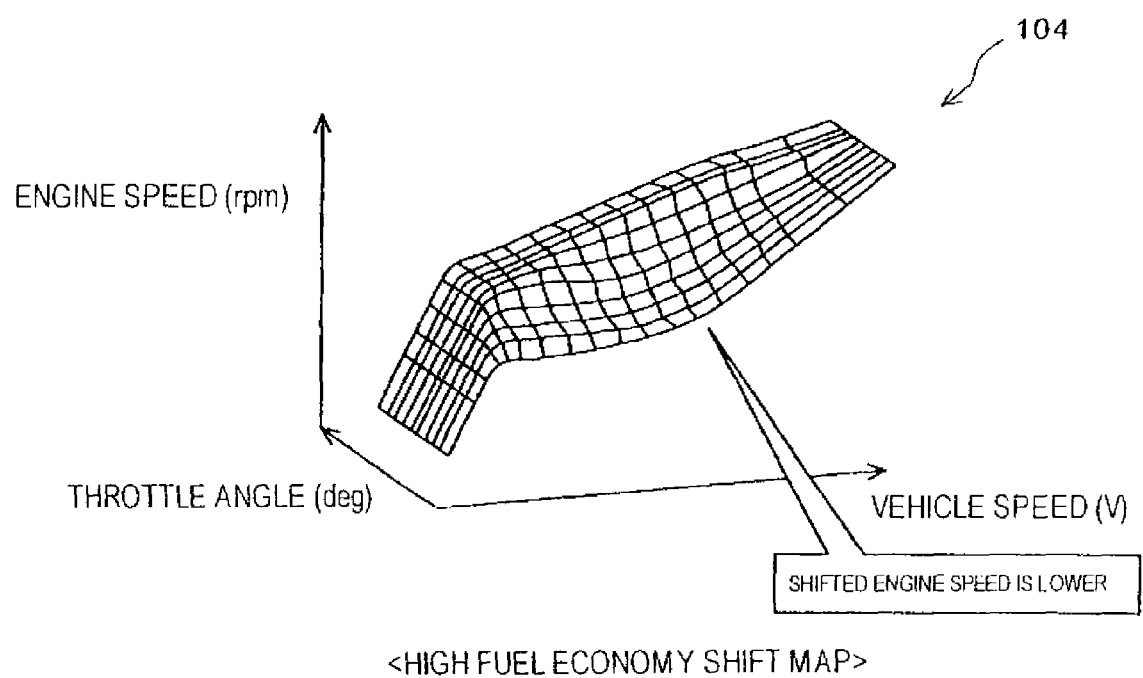

FIG. 4 show the standard shift map 4(a) and the high fuel economy shift map 4(b) respectively housed in the shift map housing 102. The two shift maps are both three-dimensional maps for deriving engine speed as shift timing based upon the vehicle speed of the motorcycle 50 and a throttle angle. When both shift maps are compared, shifted engine speed in the high fuel economy shift map 104 is set so that it is lower than shifted engine speed in the standard shift map 103 in case that vehicle speed and a throttle angle are the same, and the settings are greatly different. Therefore, when the high fuel economy shift map 104 is selected, the engine 1a is not accelerated to high revolution speed, early shift is executed, hereby, the fuel economy of the motorcycle 50 is enhanced, and the fuel consumption can be reduced. The number of shift maps housed in the shift map housing 102 may be also three or more including a type that emphasizes engine performance, for example.

Figure 5:
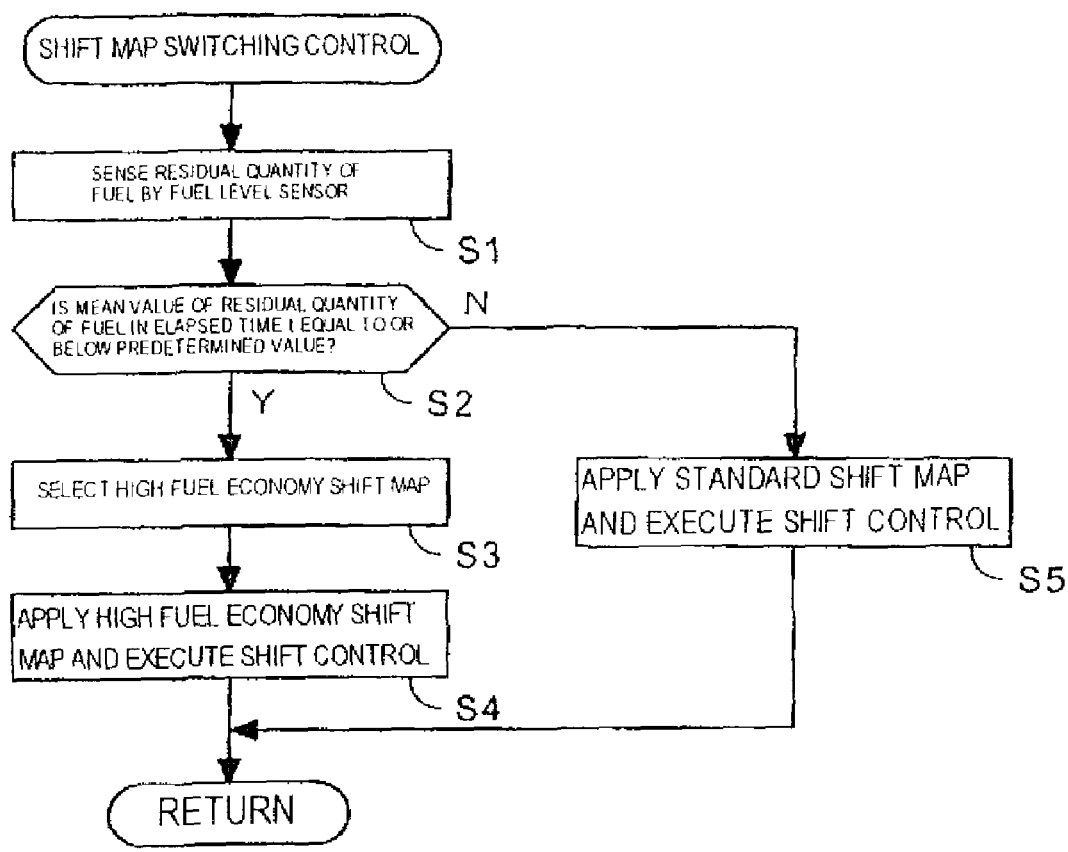
FIG. 5 is a flowchart showing a procedure for shift map switching control equivalent one embodiment of the invention.

FIG. 5 is a flowchart showing a procedure for shift map switching control executed by the controller 101. In step S1, an output signal of the fuel level sensor 72 is sensed to measure the residual quantity of fuel. In step S2, it is determined whether a mean value of the residual quantity of fuel in elapsed time t is equal to or smaller than a predetermined value or not. This determination is made to prevent operation for switching shift maps from being frequently executed when a fuel level in the fuel tank 71 is rocked depending upon how a driving condition and an output signal of the fuel level sensor 72 varies. The predetermined value of the residual quantity of fuel can be set to 5 liters, for example. When an affirmative determination is made in step S2, the high fuel economy shift map 104 is selected in step S3. In the following step S4, automatic shift control according to the high fuel economy shift map 104 is executed in place of the standard shift map 103 selected in normal driving. When negative determination is made in step S2, control is passed to step S5 and automatic shift control by the standard shift map 103 is executed.

As described above, according to the shift map switching control unit according to the invention, as the shift map of the automatic transmission is automatically switched to the high fuel economy shift map when the residual quantity in the fuel tank is equal to or below the predetermined value, distance drivable with residual fuel can be extended without the rider's operation for switching. Hereby, anxiety about the shortage of gasoline is reduced and a sense of security can be given to the rider.

Figure 6:
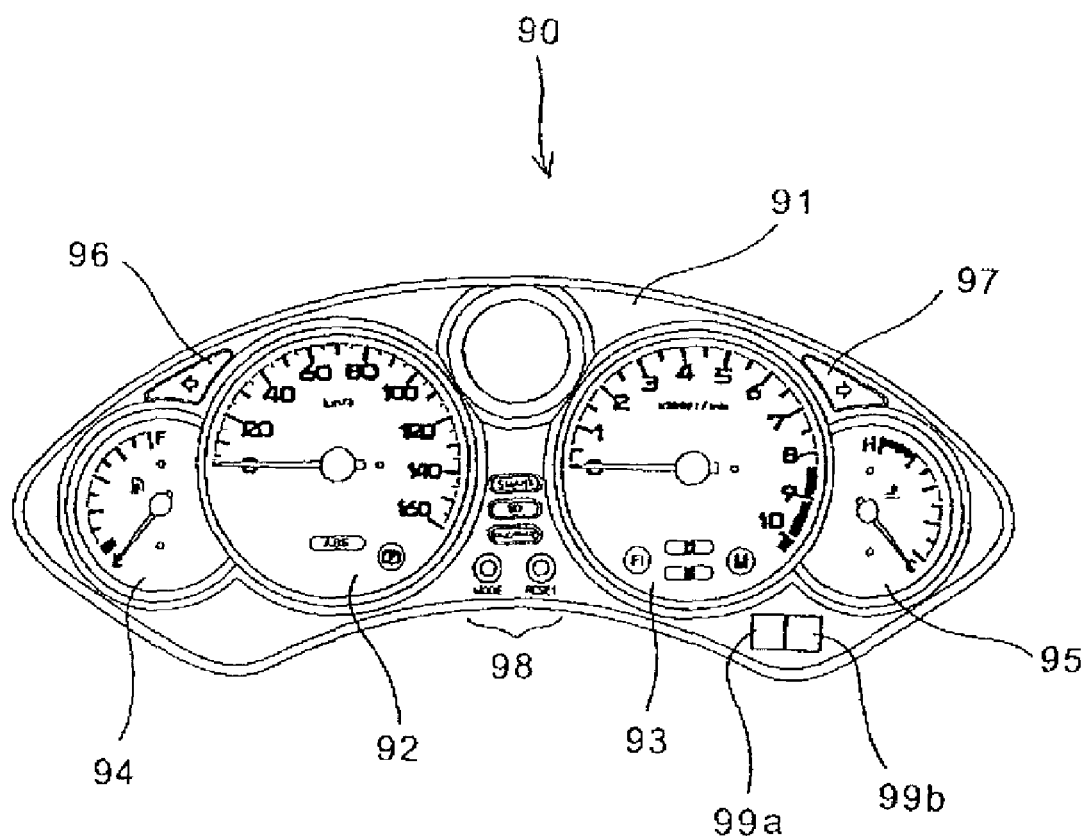
FIG. 6 is a front view showing a meter unit equivalent to one embodiment of the invention.

FIG. 6 is a front view showing the meter unit 90 arranged in the vicinity of the handlebar 52. The meter unit 90 houses a speedometer 92 operated according to an output signal from the vehicle speed sensor 32, a tachometer 93 operated according to an output signal from the Ne sensor 30, a fuel gauge 94 operated according to an output signal from the fuel level sensor 72, a water temperature gauge 95 operated according to an output signal from a coolant temperature sensor (not shown) attached to the engine 1a, turn signal lamp operating lamps 96, 97, an alarm lamp and a group of buttons 98 in a housing 91 made of resin or other materials. Operational mode display lamps 99a, 99b that display the currently selected shift map are arranged under the tachometer 93 and the water temperature gauge 95.

The operational mode display lamps 99a, 99b can be configured so that the left lamp is lit when the standard shift map 103 is applied and the right lamp is lit when the high fuel economy shift map 104 is applied, for example. When the standard shift map 103 is switched to the high fuel economy shift map 104, the operational mode display lamp 99b is flickered before the shift maps are actually switched and the switching operation may be also notified to the rider beforehand. Further, a liquid crystal display panel is provided, and notice that as residual fuel is short, the current mode is to be switched to a high fuel economy mode, and drivable distance with residual fuel may be also displayed. According to the above-mentioned display function, a sense of security of the rider can be enhanced by informing the rider various information in relation to low residual fuel, and the marketability of the motorcycle can be enhanced.

The configuration of the shift maps, the number housed in the shift map housing, the capacity of the fuel tank, the predetermined value of residual quantity of fuel at which switching control is executed and the contents of the display that displays an applied condition of the shift maps are not limited to those in the embodiment and it need scarcely be said that various transformations are allowed. The shift map switching control unit according to the invention can be applied to various vehicles that are driven by fuel, the residual quantity of which can be measured, and control the shift of an automatic transmission according to a shift map.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A shift map switching control unit for controlling a shift timing of an automatic transmission of a vehicle, comprising:
 a plurality of shift maps for deriving the shift timing of the automatic transmission;
 a fuel sensor that senses a residual quantity of fuel in a fuel tank of the vehicle;
 a controller for selecting one of said plurality of shift maps for switching control of a shift of the automatic transmission, at least based partly upon an input received from said fuel sensor; and
 a display for displaying a condition in which the shift map of the high fuel economy type is selected,
 wherein, when said controller receives an input from said fuel sensor representing the state that a residual quantity of fuel in the fuel tank is equal to or below a predetermined value, said controller selects a shift map of a high fuel economy type in which fuel consumption is reduced, wherein the residual quantity of fuel in the fuel tank is sensed based upon a mean value of output signals from said fuel sensor in a predetermined period of time, and wherein when said controller switches to the shift map of the high fuel economy type, the display is flickered before the shift map switching is initiated.

2. The shift map switching control unit of claim 1, wherein said display includes a first lamp and a second lamp, said first lamp being illuminated when a shift map of a standard fuel economy type is selected and said second lamp being illuminated when the shift map of the high fuel economy type is selected, and wherein when said controller switches to the shift map of the high fuel economy type, the second lamp is flickered before the shift map switching is initiated.

* * * * *